United States Patent
Berman

(10) Patent No.: US 7,296,654 B1
(45) Date of Patent: Nov. 20, 2007

(54) TUNABLE STACKED PLATE VIBRATION ISOLATOR

(75) Inventor: Morris S. Berman, Olney, MD (US)

(73) Assignee: United States of America as Represented by the Secretary of the Army, Washington, DC (US)

( * ) Notice: Subject to any disclaimer, the term of this patent is extended or adjusted under 35 U.S.C. 154(b) by 349 days.

(21) Appl. No.: 10/956,589

(22) Filed: Sep. 29, 2004

(51) Int. Cl.
*F16F 7/08* (2006.01)
*F16F 7/01* (2006.01)
*F16F 7/00* (2006.01)
*F16F 15/02* (2006.01)

(52) U.S. Cl. .................... 181/207; 181/209
(58) Field of Classification Search ......... 181/207–209
See application file for complete search history.

(56) References Cited

U.S. PATENT DOCUMENTS

| | | | | |
|---|---|---|---|---|
| 3,102,722 A | * | 9/1963 | Hamontre | 267/165 |
| 3,107,905 A | * | 10/1963 | Lucas | 267/161 |
| 3,966,026 A | * | 6/1976 | Fillderman | 188/73.37 |
| 4,064,975 A | * | 12/1977 | Filderman | 188/73.37 |
| 4,067,184 A | * | 1/1978 | Johnson, Jr. | 57/135 |
| 4,103,761 A | * | 8/1978 | Filderman | 188/73.37 |
| 4,203,195 A | * | 5/1980 | Nakae et al. | 29/505 |
| 4,392,681 A | * | 7/1983 | Raquet | 295/7 |
| 4,516,658 A | * | 5/1985 | Scarton et al. | 181/208 |
| 5,240,221 A | * | 8/1993 | Thomasen | 248/559 |
| 5,339,652 A | * | 8/1994 | Dreiman | 62/296 |
| 5,528,005 A | * | 6/1996 | Bschorr et al. | 181/208 |
| 5,550,335 A | * | 8/1996 | Ermert et al. | 181/207 |
| 5,661,271 A | * | 8/1997 | Moser | 181/199 |
| 5,750,272 A | | 5/1998 | Jardine | |
| 6,279,679 B1 | * | 8/2001 | Thomasen | 181/208 |
| 6,332,509 B1 | * | 12/2001 | Nishikawa et al. | 181/207 |
| 6,536,555 B1 | * | 3/2003 | Kelsic et al. | 181/207 |
| 6,550,868 B2 | * | 4/2003 | Kobayashi et al. | 301/6.91 |
| 6,589,643 B2 | | 7/2003 | Okada et al. | |
| 7,023,657 B2 | * | 4/2006 | Sohn et al. | 360/99.08 |

FOREIGN PATENT DOCUMENTS

DE 3113268 A1 * 10/1982

OTHER PUBLICATIONS

James, M.L, et al., "Vibration of Mechanical and Structural Systems: with Microcomputer Applications," Second Edition, Harper Collins, New York, 1994, pp. 179-180.
Dimarogonas, A.D., et al., "Virbation for Engineers," Prentice-Hall, New Jersey, 1992, pp. 154-155.

* cited by examiner

*Primary Examiner*—Edgardo San Martin
(74) *Attorney, Agent, or Firm*—William Randolph

(57) ABSTRACT

Disclosed is a method and apparatus for reducing vibrations in an electrical device, wherein the apparatus comprises a plurality of stacked metal plates, wherein the stacked metal plates move frictionally opposed to one another upon excitation of the device, and wherein movement of the stacked metal plates produces damping of the vibrations. The apparatus further comprises a clamp retaining the stacked metal plates, and a plurality of retaining mechanisms, wherein the clamp adjusts a force holding the stacked metal plates together, and wherein the clamp controls an amount of friction produced by the movement of the stacked metal plates. Also, the surfaces of the stacked metal plates comprise a machined surface finish, wherein the machined surface finish controls an amount of friction produced by the movement of the stacked metal plates. Moreover, the stacked metal plates are dimensioned and configured to control a frequency response of the vibrations.

28 Claims, 3 Drawing Sheets

TUNABLE STACKED PLATE VIBRATION ISOLATOR

GOVERNMENT INTEREST

The invention described herein may be manufactured, used, and/or licensed by or for the United States Government.

BACKGROUND OF THE INVENTION

1. Field of the Invention

The invention generally relates to vibration isolators, and more particularly to a tunable stacked metal plate vibration isolator used for damping vibrations in an electrical device.

2. Description of the Related Art

Within this application several publications are referenced by Arabic numerals within brackets. Full citations for these publications may be found at the end of the specification immediately preceding the claims. The disclosures of all these publications in their entireties are hereby expressly incorporated by reference into the present application for the purposes of indicating the background of the invention and illustrating the general state of the art.

Generally, vibration isolation optimization involves reducing the magnitudes of acceleration transmitted from moving components of devices, machines, structural systems, mountings, etc. to supporting devices, structures, and foundations, etc.[1] Similarly, vibration isolation optimization involves reducing the support motion transmitted to instruments, equipment, or peripheral devices of an overall system.[1] When the forces generated by moving components of a system are transmitted to other components (instruments, etc.) in the system, undesirable vibrations are often generated in the entire system, wherein instruments and equipment can malfunction and suffer extreme damage through failure if not properly isolated from the vibration source.[1] Usually, vibration isolators use elastic material such as cork, rubber, urethane, or neoprene to provide damping to the system.[2]

The electronic components in an artillery shell are often subjected to significant vibrational energy, which causes deleterious effects on the electronic component itself and attached elements. In order to reduce the vibration level experienced by the electronic component, damping mechanisms which isolate the vibrational energy are used. There are many forms and varieties of conventional vibration isolators. However, these conventional devices are not easily tunable without additional machining and, in fact, often require complex machining. Moreover, many of these conventional devices use elastomers. Unfortunately, the use of elastomers introduces significant temperature dependence for efficient performance. Such extreme temperature requirements often result in degradation of the vibration isolator when operated over a wide temperature range or of the electronic component itself.

Therefore, due to the limitations of the conventional vibration isolator devices and processes, there remains a need for a novel vibration isolator device, which does not use elastomers, is compactly sized, and is easily tunable, and which provides proper vibration isolation to an attached device.

SUMMARY OF INVENTION

In view of the foregoing, an embodiment of the invention provides an apparatus for reducing vibrations in a device, wherein the apparatus comprises a plurality of stacked metal plates, wherein the stacked metal plates move frictionally opposed to one another upon excitation of the device, and wherein movement of the stacked metal plates produces damping of the vibrations. The apparatus further comprises a clamp retaining the stacked metal plates, wherein the clamp adjusts a force holding the stacked metal plates together, and wherein the clamp controls an amount of friction produced by the movement of the stacked metal plates. Also, the surfaces of the stacked metal plates comprise a machined surface finish, wherein the machined surface finish and choice of plate material controls the amount of friction produced by the movement of the stacked metal plates. Moreover, the stacked metal plates are dimensioned and configured to generate a specific frequency response to the input vibration. The apparatus further comprises a retaining means attaching an outer edge of the stacked metal plates to a peripheral support and a retaining mechanism attaching an inner edge of the stacked metal plates to the device. In one embodiment, the metal plates further comprise a central opening for receiving the device.

In another embodiment, the invention provides an apparatus for reducing vibrations in an electrical component of an artillery shell, the apparatus comprising a stack of metal plates, wherein the metal plates move frictionally opposed to one another upon vibration excitation of the artillery shell, and wherein movement of the metal plates causes damping of the vibrations.

Furthermore, in another embodiment, the invention provides a method for reducing vibrations in an electrical component of an artillery shell, wherein the method comprises stacking a plurality of metal plates, attaching the metal plates to the electrical component, creating vibrations in the artillery shell, and damping the vibrations transmitted to a mounted electronic component by moving the metal plates frictionally opposed to one another. Additionally, the method further comprises retaining the metal plates using a clamp, adjusting a force holding the metal plates together using the clamp, controlling an amount of friction produced by movement of the metal plates using the clamp, and controlling an amount of friction produced by movement of the metal plates using the choice of plate material and a machined surface finish on the surfaces of the metal plates, wherein the metal plates are dimensioned and configured to generate a specific frequency response to the input vibration.

There are several advantages achieved by the novel aspects of the invention. Specifically, the advantages of the invention include, but are not limited to, the invention's complete reliance on metal components without the use of elastomers, its compact size, and its tunability. The invention is tuned by adjusting the relationship between parts by varying the torque on the clamp screws, which are part of the retaining mechanism. Moreover, the multi-functionality of the invention is also advantageous, because while a preferred embodiment of the invention is to implement a vibration isolator for use in reducing vibrations in an electrical component in an artillery shell, the invention may also be used for the vibrational isolation of any component in a high frequency vibration environment. Other high frequency environments include, but are not limited to, vehicle ballistic shock, armored vehicle main gun firing, vehicle subjected to mine blast, payload during spacecraft launch, item dropped on a hard floor, and payload in any sort of vehicle.

Furthermore, the invention uses friction from interplate plate shearing as the vibration energy absorbing means instead of using conventional elastomers, which can suffer from performance limitations. Moreover, the system provided by the invention can be configured for a wide range of natural frequencies, which allows it to be useful in a wide range of applications. Additionally, according to the invention the isolator may prove useful in any high acceleration, high frequency vibration environment.

These and other aspects and advantages of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description of the preferred embodiments of the invention with reference to the drawings, in which.

DETAILED DESCRIPTION OF PREFERRED EMBODIMENTS OF THE INVENTION

Figure 1:
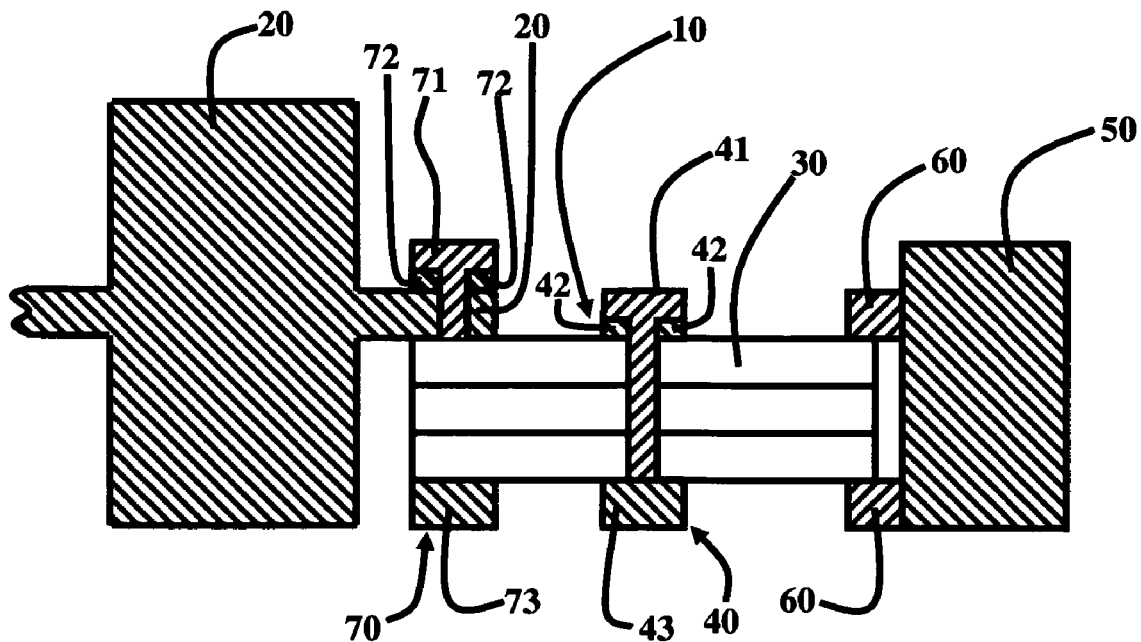
FIG. 1 is a cross-sectional view of a vibration isolator apparatus used in conjunction with an electrical device and structural system according to the invention.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

As previously mentioned, there is a need for a novel vibration isolator device, which does not use elastomers, is compactly sized, and is easily tunable. Referring now to the drawings, and more particularly to FIGS. 1 through 5, there are shown preferred embodiments of the invention.

Figure 2:
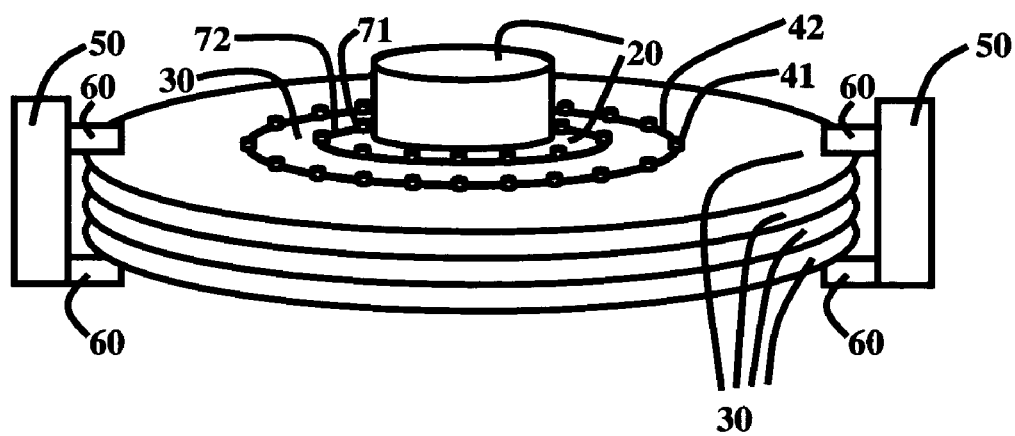
FIG. 2 is a perspective view of a vibration isolator apparatus and a surrounding system as in FIG. 1.
Figure 3:
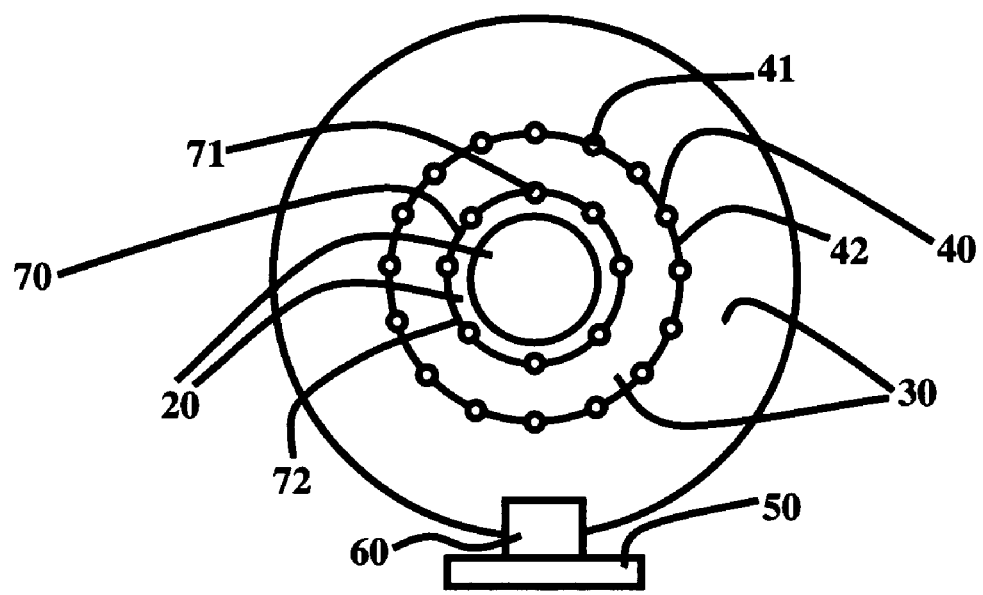
FIG. 3 is a top view of the vibration isolator and surrounding system as in FIG. 1.
Figure 5:
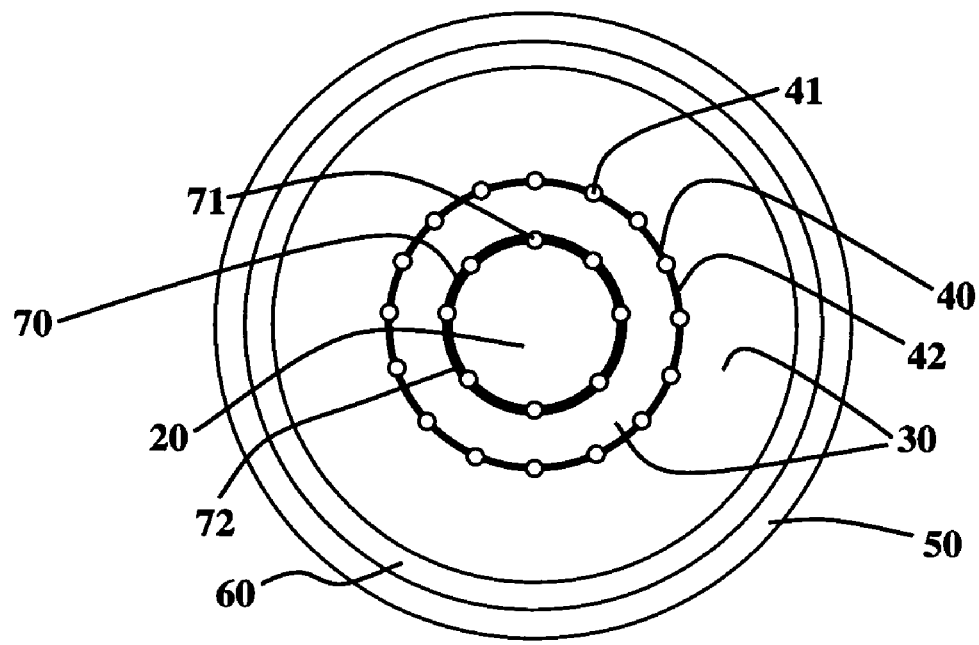
FIG. 5 is a top view of the vibration isolator and surrounding system utilizing full circumferential support.

FIGS. 1 through 5 illustrate various views of an overall system using an apparatus 10 for reducing vibrations in a device (device mounting) 20, such as an electrical component of an artillery shell, wherein the apparatus 10 comprises a plurality of stacked metal plates 30, wherein the stacked metal plates 30 move frictionally opposed to one another upon excitation of a peripheral support such as mount point 50, and wherein movement of the stacked metal plates 30 produces damping of the vibrations. The apparatus 10 further comprises clamping means 40 for retaining the stacked metal plates 30, wherein the clamping means, preferably embodied as a clamp 40 adjusts a force holding the stacked metal plates 30 together, and wherein the clamp 40 controls an amount of friction produced by the movement of the stacked metal plates 30. The clamp 40 generally comprises a securing mechanism 41, such as a screw or bolt or similar component, a circumferentially continuous receiving mechanism 43 for receiving the securing mechanism 41, and a securing clip 42 circumferentially arranged on the surface of the uppermost metal plate 30 surrounding the device mounting 20, whereby the securing clip 42 includes apertures arranged therein for accepting the securing mechanism 41. In one embodiment, the metal plates 30 further comprise a central opening for receiving the device 20. In FIGS. 2, 3 and 5, the central opening of the metal plates 30 is filled by the device 20.

Also, the surfaces of the stacked metal plates 30 comprise a machined surface finish, wherein the machined surface finish as well as the choice of plate material, controls an amount of friction produced by the movement of the stacked metal plates 30. Preferably, the plates 30 comprise aluminum. However, other metals known to achieve machined surfaced finishes may also be used in accordance with the invention. Moreover, the stacked metal plates 30 are dimensioned and configured to control a frequency response of the damping of the vibrations. Manners of achieving a machined surface finish are well known in the art. However, with respect to the machined surface finish of the metal plates 30 provided by the invention, a rougher finish would result in more friction and more shearing. However, this is simply a parameter that can be varied to further tune the device. As such, it is possible to use alternating metals, to take advantage of the different coefficients of friction of different metals such as of brass, copper, steel, etc.

Essentially, the vibration isolator 10 comprises two parts: the stack of metal plates 30 and the retaining clamp 40. According to an embodiment of FIG. 1, three plates may be used. However, the optimal number of plates is determined by the mass of the component to be isolated, the desired frequency response, and the expected vibration loading. As such, there is not a limit to the number or thickness of the plate as long as they support the required load.

In the FIG. 2 example of a system, which may implement the vibration isolator 10 of the invention includes an electronic component 20, two peripheral supports 50 used for holding an outer edge of the stack of metal plates 30 and for introducing vibrations, a retaining means 60 used for retaining an outer edge of the stack of metal plates 30 to the support 50, and a retaining mechanism 70 used for retaining a central or inner edge of the stack of metal plates 30 to the electronic component (device) 20. These are all parts of the system into which the vibration isolator 10 fits. The retaining mechanism 70 generally comprises a securing mechanism 71, such as a screw or bolt, a receiving mechanism 73 for receiving the securing mechanism 71, and a securing clip 72 circumferentially arranged on the electronic component 20, which is then configured on the uppermost metal plate 30, and which surrounds the device 20. The securing clip 72 includes apertures arranged therein for accepting the securing mechanism 71.

The number of plates 30, thickness, and clamping force are variable to impart different isolation parameters. Due loads applied to the system, the support 50 may vibrate up and down while the electronic component 20 remains still. As the peripheral support 50 vibrates, the layered plates 30 shear between each other to dampen the vibration energy as it propagates to the electronic component 20. As the metal plates 30 shear with the surface portions of the plates rubbing against each other, the vibrational energy in the support 50 dissipates into heat generated by the friction between the shearing plates 30. The clamp 40 is used to adjust the force holding the plates 30 together, and thus the clamp 40 controls the amount of friction between the plates 30. For example, the applied torque on the clamping mechanism 40 may range from 5 in-lb to 20 in-lb.

Another embodiment of the peripheral support may include a full circumferential support as illustrated in FIG. 5. In this configuration, the supports 50 and 60, completely encircle the plates 30. This support provides additional support to the electronic component 20 in high acceleration environments as will providing more efficient damping between plates 30.

The number of plates 30 and the thickness of each plate 30 can be varied to allow for different isolation parameters such as the maximum displacement and natural frequency. Preferably, the stacked plates 30 should be capable of supporting the electronic component 20 when subjected to the operating environment without failure. Moreover, the plates 30 should also not allow the electronic component 20 to be displaced beyond a design limit (which depends on the application of use), otherwise connecting mechanisms, such as cables will stretch and break.

The natural frequency is a critical design parameter of any vibration isolation system. In fact, the component being isolated will inevitably suffer failure if it is subject to vibrations beyond its designed amplitude and frequency. As such, the invention addresses and solves these concerns with the novel use of the stacked plates 30 in order isolate the vibrations.

Figure 4:
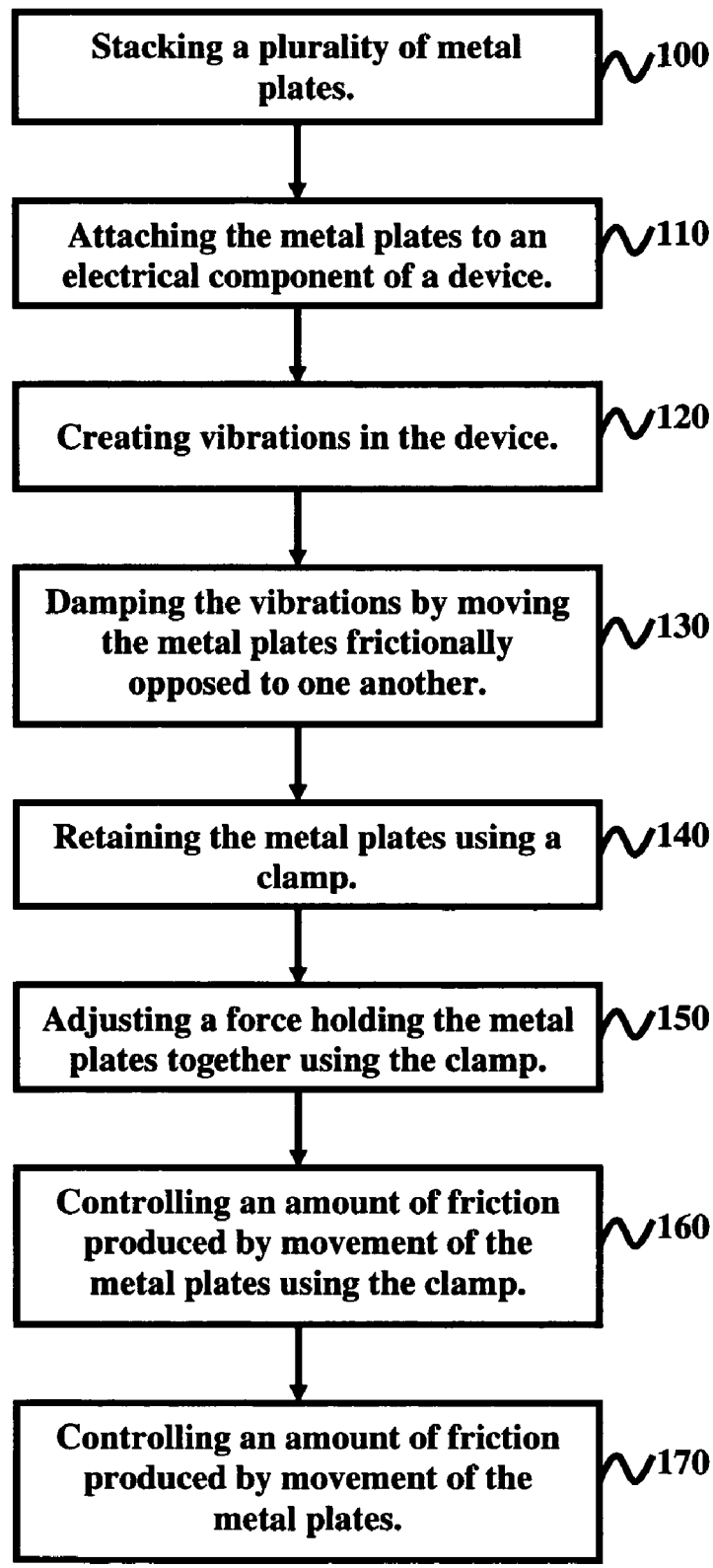
FIG. 4 is a flow diagram illustrating a preferred method of the invention.

In another embodiment illustrated in the flow diagram of FIG. 4, the invention provides a method for reducing vibrations in an electrical component 20 of a device such as an artillery shell, wherein the method comprises stacking 100 a plurality of metal plates 30, attaching 110 the metal plates 30 to the electrical component 20, creating 120 vibrations in the device 20, and damping 130 the vibrations by moving the metal plates 30 so that they are frictionally opposed to one another. The method further comprises retaining 140 the metal plates 30 using a clamp 40, adjusting 150 a force holding the metal plates 30 together using the clamp 40, controlling 160 an amount of friction produced by movement of the metal plates 30 using the clamp 40, and controlling 170 an amount of friction produced by movement of the metal plates 30 using a machined surface finish on the surfaces of the metal plates 30, wherein the metal plates 30 are dimensioned and configured to control a frequency response of the isolator.

Experimental tests were conducted to test damping effects of a vibration isolator according to the invention. The results of the experiment indicates that varying the number of plates changes only the stiffness of the isolator (and thus its resonant frequency), but does not affect how rapidly energy is absorbed. Additionally, varying the friction coefficient between plates changes the rate of energy dissipation, but has negligible effect on the stiffness. These relationships are important when tuning an isolator for a specific application, such as the applications described below.

The advantages of the invention are several. These include, but are not limited to, the reliance on metal components without the use of elastomers, its compact size, and its tunability. The apparatus 10 is tuned (tunability) by adjusting the relationship between the various components of the apparatus by varying the torque on the clamp screws 41. Moreover, the multi-functionality of the invention is also advantageous, because while a preferred embodiment of the invention is to implement a vibration isolator 10 for use in reducing vibrations in an electrical component 20 in an artillery shell, the invention may also be used for the vibrational isolation of any component in a high frequency vibration environment. Other high frequency environments include, but are not limited to, vehicle ballistic shock, armored vehicle main gun firing, vehicle subjected to mine blast, payload during spacecraft launch, item dropped on a hard floor, and payload in any sort of vehicle.

Furthermore, the invention uses friction from interplate plate shearing as a vibration energy absorbing means instead of using elastomers, which can suffer from performance limitations. Moreover, the system provided by the invention can be configured for a wide range of natural frequencies, which allows it to be useful in a wide range of applications. Additionally, according to the invention the isolator may prove useful in any high acceleration, high frequency vibration environment.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

REFERENCES

[1] James, M. L., et al., *Vibration of Mechanical and Structural Systems: with Microcomputer Applications*, Second Edition, Harper Collins, New York, 1994, pp. 179-180.
[2] Dimarogonas, A. D., et al., *Vibration For Engineers*, Prentice-Hall, New Jersey, 1992, pp. 154-155.

What is claimed is:

1. An apparatus for reducing vibrations in an electrical component of an artillery shell having a support structure for the electrical component, comprising:
a plurality of plates arranged in a stack, wherein the plates move frictionally relative to one another to dampen the vibrations produced upon excitation of the artillery shell;
a first clamp means attached to the support structure and the plates for connecting the plates to the support structure;
a second clamp means attached to the plates and the electrical component for connecting the electrical component to the plates, where the electrical component is spaced from and supported by the support structure.

2. The apparatus of claim 1, further comprising a securing means attached to the plates for applying pressure to the plates to control the amount of friction produced by vibration of the plates, where friction from interplate shearing absorbs vibrational energy.

3. The apparatus of claim 1, wherein surfaces of the plates comprise a machined surface finish, the machined surface finish controls the friction produced by the vibration of the plates and the plates are dimensioned and configured to produce a frequency response to the vibrations.

4. The apparatus of claim 1, wherein the first clamp means comprises a retaining ring which circumferentially encircles and is attached to the plates.

5. The apparatus of claim 4, further comprising a securing means attached to an intermediate portion of the plates for clamping the plates together and applying pressure to the plates.

6. The apparatus of claim 5, wherein the plates have aligned openings formed therein and the electrical component is positioned in the aligned openings of the plates, and the second clamp means secures the electrical component to the plates at the aligned openings.

7. The apparatus of claim 4, wherein the plates have aligned openings formed therein and the electrical component is positioned in the aligned openings of the plates, and the second clamp means secures the electrical component to the plates at the aligned openings.

8. The apparatus of claim 7, where the first clamp means is attached to the outer edges of the plates.

9. The apparatus of claim 8, where the electrical component is spaced from and cantilevered from the support structure.

10. The apparatus of claim 1, wherein the plates have aligned openings formed therein and the electrical component is positioned in the aligned openings of the plates, and the second clamp means secures the electrical component to the plates at the aligned openings.

11. The apparatus of claim 10, further comprising a securing means attached to the plates for holding the plates together and adjustably applying pressure to the plates, and the plates are dimensioned to generate a specific frequency response to the vibrations.

12. The apparatus of claim 1, where the electrical component is spaced from and cantilevered from the support structure.

13. The apparatus of claim 1, wherein the dimensions of the plates, the plate material, and the number of plates is selected and configured to generate a selected frequency response to the vibrations and varying the pressure between the plates adjusts the rate of energy dissipation of the vibrations.

14. The apparatus of claim 1, wherein the metal plates are circular with central aligned openings, and the first clamp means is connected to peripheral edge portions of the metal plates and the support structure, and the second clamp means is connected to the plates and the electrical component for supporting the electrical component within the central openings of the plates, so that the electrical component is cantilevered from the support structure.

15. An apparatus for reducing vibrations to a component of a device having a support structure for the component, comprising:
a plurality of plates arranged in a stack, wherein the plates move frictionally relative to one another to dampen the vibrations produced upon movement of the device;
a first clamp means attached to the support structure and the plates for connecting the plates to the support structure;
a second clamp means attached to the plates and the component for connecting to the component to the plates, where the component supported in a spaced relationship from the support structure of the device; and
securing means attached to the plates for applying pressure to the plates to adjust the pressure between the plates for controlling the rate at which the vibrations are dampened.

16. The apparatus of claim 15, wherein surfaces of the plates comprise a machined surface finish, the machined surface finish controls the friction produced by the vibration of the plates and the plates are dimensioned and configured to produce a frequency response to the vibrations.

17. The apparatus of claim 15, wherein the first clamp means comprises a retaining ring which circumferentially encircles and is attached to the plates.

18. The apparatus of claim 17, wherein the plates have aligned openings formed therein and the component is positioned in the aligned openings of the plates, and the second clamp means secures the component to the plates at the aligned openings.

19. The apparatus of claim 18, where the first clamp means is attached to the outer edges of the plates.

20. The apparatus of claim 15, wherein the plates have aligned openings formed therein and the component is positioned in the aligned openings of the plates, and the second clamp means secures the component to the plates at the aligned openings.

21. The apparatus of claim 20, where the first clamp means is attached to the outer edges of the plates, so the component is supported away from and cantilevered from the support structure.

22. The apparatus of claim 15, where the component is spaced from and cantilevered from the support structure.

23. The apparatus of claim 15, wherein the plates have aligned central openings formed therein and the component is positioned in the aligned central openings of the plates, and the second clamp means secures the component to the plates at the aligned central openings.

24. The apparatus of claim 15, wherein the dimensions of the plates, the plate material, and the number of plates is selected and configured to generate a selected frequency response to the vibrations and varying the pressure between the plates adjusts the rate of energy dissipation of the vibrations.

25. The apparatus of claim 15, wherein the metal plates are circular with central aligned openings, and the first clamp means is connected to peripheral edge portions of the metal plates and the support structure, and the second clamp means is connected to the plates and the component for supporting the component within the central openings of the plates, so that the electrical component is cantilevered from the support structure.

26. A method for reducing vibrations in a component of a device having plates attached to both the component and a support structure of the device so that the component is supported from the support structure in spaced, cantilevered relationship, where the plates are used to reduce the vibrations, comprising:
arranging a plurality of metal plates in a stack, where the plates are arranged move frictionally relative to one another to dampen the vibrations produced by the movement of the device, where the dimensions of the plates, the number of plates, and the plate material are selected to generate a selected frequency response of the plates to the vibrations;
clamping the plates together and adjusting the clamping pressure between the plates to control the rate at which the vibrations are dampened by frictional movement of the plates relative to one another.

27. The method of claim 26, wherein the device comprises an artillery shell.

28. The method of claim 26, further comprising roughening the surfaces of the plates to increase the frictional energy between the plates to increase the rate of vibrational energy dissipated in the device.

* * * * *